United States Patent
Kobayashi (10) Patent No.: US 7,397,199 B2
(45) Date of Patent: Jul. 8, 2008

(54) DISCHARGE LAMP LIGHTING DEVICE (75) Inventor: Masami Kobayashi, Ehime (JP)

(73) Assignee: Harison Toshiba Lighting Corp., Ehime (JP)

( * ) Notice: Subject to any disclaimer, the term of this patent is extended or adjusted under 35 U.S.C. 154(b) by 39 days.

(21) Appl. No.: 11/258,095

(22) Filed: Oct. 26, 2005

(65) Prior Publication Data

US 2006/0087252 A1    Apr. 27, 2006

(30) Foreign Application Priority Data

Oct. 27, 2004  (JP) .............................. 2004-312843
Nov. 30, 2004  (JP) .............................. 2004-347155

(51) Int. Cl.
  *H05B 37/02* (2006.01)
(52) U.S. Cl. .................. 315/291; 315/276; 315/307
(58) Field of Classification Search ............ 315/209 R, 315/224, 226, 291, 307, DIG. 7, 237, 276
See application file for complete search history.

(56) References Cited

U.S. PATENT DOCUMENTS 6,181,076 B1 * 1/2001 Trestman et al. ............ 315/224
6,483,253 B1 * 11/2002 Okamoto et al. ............ 315/219
6,570,347 B2 * 5/2003 Kastner ....................... 315/307
6,636,190 B2 * 10/2003 Hirakata et al. ............ 345/74.1
6,646,389 B2 * 11/2003 Kobayashi ............... 315/209 R
6,646,391 B2 * 11/2003 Okamoto et al. ............ 315/246
6,850,016 B2 * 2/2005 Oda et al. .................... 315/291
6,975,077 B2 * 12/2005 Izumi et al. ............. 315/209 R

FOREIGN PATENT DOCUMENTS

JP    2001-283783    10/2001

* cited by examiner

*Primary Examiner*—Thuy V. Tran
*Assistant Examiner*—Jimmy T Vu
(74) *Attorney, Agent, or Firm*—DLA Piper US LLP (57) ABSTRACT

Output of a chopper circuit is converted to a rectangular wave by a push-pull circuit, and is provided to a step-up transformer. When a switch is turned on, the control voltage of the chopper circuit is relatively low, and a high output voltage is provided to the transformer. Thus, the discharge lamp starts with certainty. When the discharge lamp starts, the transistor is turned on, and the resistance generating the control voltage is connected in parallel to other resistance, and the control voltage is increased. Thus, the output of the chopper circuit is decreased, and thereafter becomes a constant voltage. Thus, the dielectric barrier discharge lamp is started with certainty, and also is driven with stability.

10 Claims, 8 Drawing Sheets

FIG.12J

DISCHARGE LAMP LIGHTING DEVICE

CROSS REFERENCE TO RELATED APPLICATIONS

This application is based on, and claims priority to, Japanese Patent Application No. 2004-312843, filed on Oct. 27, 2004, and Japanese Patent Application No. 2004-247155, filed on Nov. 30, 2004, the entire contents of which are hereby incorporated by reference.

BACKGROUND OF THE INVENTION

1. Field of the Invention

The present invention relates to a discharge lamp lighting device which is capable of illuminating a capacitive discharge lamp.

2. Description of the Related Art

Conventionally, external electrode fluorescent lamps have been used as a reading light source for photocopiers, scanners, and the like. The external electrode fluorescent lamp has advantages in that it does not use mercury which may be detrimental to the environment. Further there is little change in the amount of light emitted by the external electrode fluorescent lamp with changes in the ambient temperature. The external electrode fluorescent lamp generates little heat, and the luminescent color thereof can be changed by selecting the fluorescent substance.

The illumination voltage waveform of an external electrode fluorescent lamp can be a sine waveform, for example. Other illumination voltage waveforms such as pulse waveform or rectangular waveforms have been used to improve luminous efficiency. Japanese Unexamined Patent Application Publication No. 2001-283783 describes an external electrode fluorescent lamp suitable for a document lighting light source.

An external electrode fluorescent lamp comprises electrodes located on the outside of the bulb, and connected to a capacity load which may comprise electrodes and/or the bulb. Also, an internal-external electrode discharge lamp may comprise electrodes on the inside and outside of the bulb. Further, an internal-internal electrode discharge lamp may comprise facing electrodes within the bulb, and a capacity load. Such lamps are illuminated by dielectric barrier discharge, and are called dielectric barrier discharge lamps.

With such a dielectric barrier discharge lamp, it is necessary to apply a high voltage at start-up time. However, in the event that a rectangular waveform or a pulse waveform is used for the lamp illumination voltage, sufficient illumination voltage may not be obtained, and the illumination starting time can fluctuate. Thus, it is difficult to obtain an appropriate illumination using these techniques.

SUMMARY OF THE INVENTION

Accordingly, the embodiments described herein provide a discharge lamp lighting device which can start up a dielectric barrier discharge lamp with certainty. According to one embodiment, a discharge lamp lighting device includes a transformer for supplying an illuminating voltage to a dielectric barrier discharge lamp, a voltage control circuit for supplying voltage to a primary side of the transformer, and a push-pull circuit for supplying the output of the voltage control circuit to the primary side of the transformer, in positive phase or reverse phase. A start-up control circuit can be provided to detect an illumination current of the dielectric barrier discharge lamp, and to switch the output voltage of the voltage control circuit between a start-up time and a non-start-up time of the dielectric barrier discharge lamp.

According to another aspect of the present invention, a discharge lamp lighting device includes a transformer for supplying an illuminating voltage to a dielectric barrier discharge lamp connected on a secondary side, a voltage control circuit for supplying a voltage to a primary side of the transformer; a push-pull circuit for supplying the output of the voltage control circuit to the primary side of said transformer, in positive phase or reverse phase, an oscillating circuit for generating a signal of which the oscillating frequency can be changed, and a start-up control circuit to detect the start-up time or a non-start-up time of the dielectric barrier discharge lamp, based on the illumination current of the dielectric barrier discharge lamp, and switches the oscillating frequency of said oscillating circuit depending on said start-up time or illuminating time.

BRIEF DESCRIPTION OF THE DRAWINGS

Reference is made to the attached drawings, wherein elements having the same reference designations represent like elements throughout and wherein.

DESCRIPTION OF THE EMBODIMENTS

Figure 1:
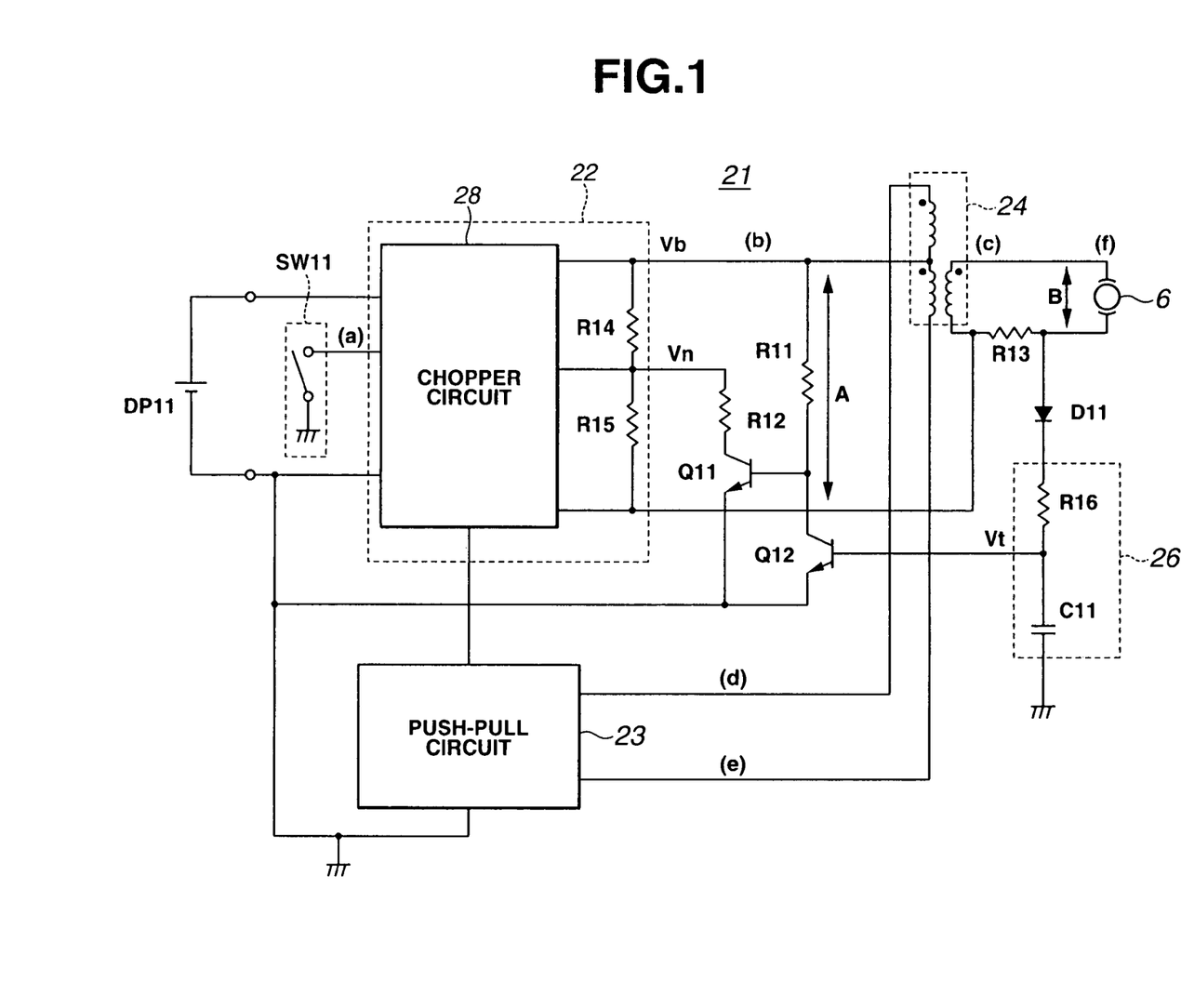
FIG. 1 illustrates a circuit diagram of discharge lamp lighting device according to a first embodiment of the present invention.
Figure 2:
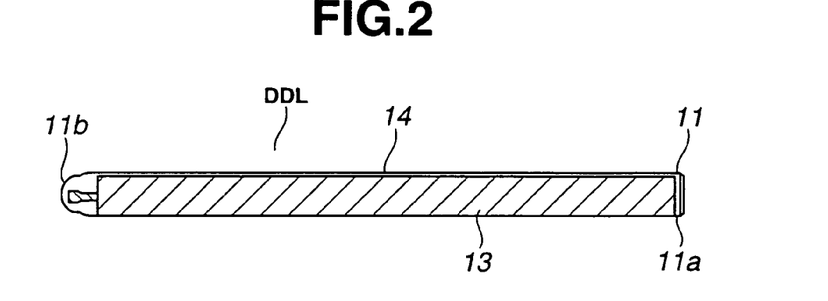
FIG. 2 illustrates a cross-sectional view of a portion of an external electrode discharge lamp which is a dielectric barrier discharge lamp.
Figure 3:
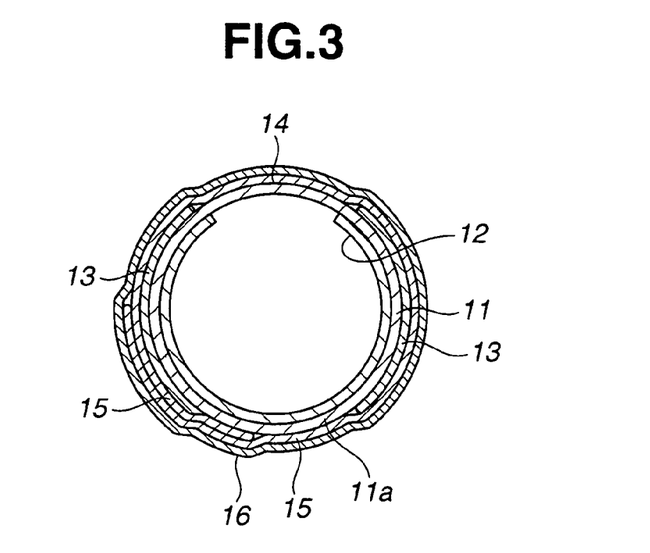
FIG. 3 illustrates a vertical cross-sectional view of a dielectric barrier discharge lamp.
Figure 4:
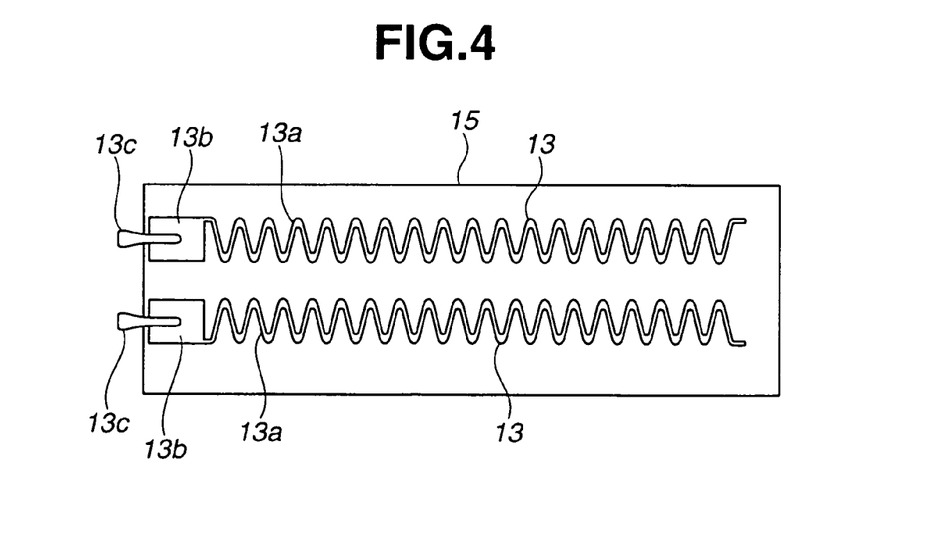
FIG. 4 illustrates an opened view of a translucent resin sheet 15 shown in FIG. 2.
Figures 5, 6A:
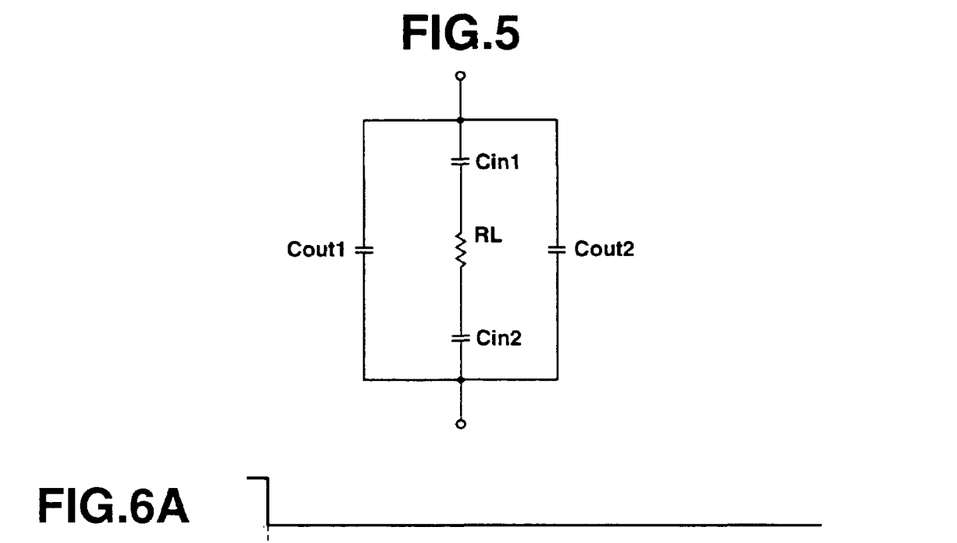
FIG. 5 illustrates an equivalent circuit diagram of the discharge lamp illustrated in FIGS. 2 through 4.
FIGS. 6A through 6F illustrate timing charts relating to the operation of the lighting device.

The embodiments will be described below with reference to he attached diagrams. FIG. 1 is a circuit diagram illustrating a discharge lamp lighting device according to a first embodiment of the present invention. FIG. 2 is a side view of an external electrode discharge lamp which is a dielectric barrier discharge lamp, and FIG. 3 is a vertical cross-sectional view thereof. FIG. 4 is an opened view of a translucent resin sheet 15, and FIG. 5 is an equivalent circuit diagram of a discharge lamp 6.

In an embodiment, an external electrode discharge lamp which is a dielectric barrier discharge lamp is used as the discharge lamp 6 in FIG. 1. However, an internal-external electrode discharge lamp or an internal-internal electrode discharge lamp can be used for the discharge lamp 6.

First, the configuration of the external electrode discharge lamp will be described with reference to FIGS. 2 through 5. The discharge lamp 6 has one pair of electrodes 13 for generating a discharge within a glass bulb 11a which is a translucent bulb. With a dielectric barrier discharge lamp, at least one pair of the electrodes 13 are provided on the outside or on the inside of the glass bulb 11a. On the inside of the glass bulb 11a, a luminescent layer is provided, and a rare gas is enclosed in the glass bulb 11a.

As illustrated in the cross-sectional view of FIG. 3, the discharge lamp 6 comprises a discharge container 11, a fluorescent substance layer 12, one pair of external electrodes 13, an aperture 14, a translucent resin sheet 15, and a translucent insulating tube 16.

The discharge container 11 is long and thin, and is formed of a glass bulb 11a of a diameter of 10 mm and an effective length of 370 mm wherein both ends thereof are sealed to be airtight, and has an exhaust tip-off portion 11b on one end. In the inside of the discharge container 11, xenon is enclosed as a discharge medium. The fluorescent substance layer 12 is formed on the portions on the inside of the discharge container 11 other than a portion along a length-wise slit.

The pair of external electrodes 13 are each formed of aluminum foil, and as illustrated in FIG. 2, are attached on the external face of the discharge container 11, and are separated to be facing each other in parallel. The external electrode 13 is adhered in advance to one face of the translucent resin sheet 15 which will be described later, and the translucent resin sheet 15 is positioned at a predetermined location on the external face of the discharge container 11 by being wrapped around the exterior of the discharge container 11.

Also, the external electrode 13 comprises an electrode main unit 13a shaped in a form of a wave, a terminal connecting unit 13b, and a terminal 13c, as illustrated in FIG. 4. The electrode main unit 13a is configured in a wave space so as to extend through a large portion of the discharge container 11 in the lengthwise direction. The terminal connecting unit 13b is positioned connected to one end of the electrode main unit 13a, and is shaped in the form of a square so as to increase the contact area with the terminal 13c. The terminal 13c is attached to the terminal connecting unit 13b with a conductive adhesive agent. The terminal 13c protrudes outside from the translucent resin sheet 15 and the translucent insulating tube 16 which is a translucent terminal shrinkage tube.

The aperture 14 is the slit-shaped portion, extending along the discharge container 11 in the longitudinal direction, where the fluorescent substance layer 12 is not formed. Accordingly, the aperture 14 portion of the discharge container 11 is transparent so that the inner portion of the discharge container 11 can be viewed clearly through the glass bulb 11a.

The translucent resin sheet 15 is formed of transparent PET (Polyethylene Terephthalate), and is of a length to cover the actual length of the discharge container 11 and is in a width that covers the discharge container 11 in the circumferential direction from the top of the aperture 14. As described above, one pair of external electrodes 13 are attached on one face with predetermined spacing. Further, an acrylic adhesive is layered on top thereof, and is attached on the external face of the discharge container 11. Thus, the one pair of external electrodes 13 are positioned on both sides with the aperture 14 in between, and the translucent resin sheet 15 is attached over the aperture 14.

The translucent insulating tube 16 is formed of a transparent fluorine resin, and covers the entire discharge container 11 from on top of the external electrodes 13 and the aperture 14.

The equivalent circuit of the discharge lamp 6 is configured with a serial circuit of a capacitor Cin1 and a load resistor RL and a capacitor Cin2, and a parallel circuit of a capacitor Cout1 and a capacitor Cout2. The capacitors Cin1 and Cin2 form electrostatic capacitance between the external electrode 13 and the inner side of the discharge container 11. Accordingly, the electrostatic capacitance of the capacitors Cin1 and Cin2 is determined by the area of the external electrode 13a and the relative permittivity and thickness of the glass which is a constituent material of the discharge container 11. Thus, the discharge lamp 6, at least, is capacitive.

In FIG. 1, a discharge lamp lighting device 21 comprises a voltage control circuit 22, a DC power source DP 11 connected to this voltage control circuit 22, an illumination switch SW11, NPN transistors Q11 and Q12, resistors R11 and R12, a push-pull circuit 23, a step-up transformer 24, a discharge lamp 6 connected to the secondary coil side of the step-up transformer 24, a resistor R13 connected to the discharge lamp 6 and one side of the secondary coil of the step-up transistor 24, a diode D11 wherein an anode is connected to the discharge lamp 6 and a connect point of a resistor R13, and a time constant circuit 26 connected to a cathode of this diode D11. The time constant circuit 26 is configured by serially connecting the resistor R16 and the capacitor C11.

The voltage control circuit 22 comprises a chopper circuit 28, a resistor R14, and a resistor R15. The chopper circuit 28 is connected to the DC power source DP 11 and an illumination switch SW11. The DC power source DP 11 has a voltage of 24 V, for example, but this voltage may fluctuate plus or minus several percent, and accordingly voltage stability is effected by the voltage control circuit 22. In other words, the output of the DC power source DP 11 is supplied to the chopper circuit 28. The chopper circuit 28 boosts or steps down the input voltage. The output voltage of the chopper circuit 28 is divided by the resistor R14 and the resistor R15, and the voltage at the connecting point of the resistors R14 and R15 is supplied to the chopper circuit 28 as the control voltage.

The chipper circuit 28 increases the output voltage Vb when the potential of the control voltage becomes high, and lowers the output voltage Vb when the potential of the control voltage becomes low. The resistors R11 through R16, the capacitor C11, the diode D11, and the transistors Q11 and Q12 configure the start-up control circuit which switches the chopper circuit 28 output at start-up time and otherwise of the lamp 6.

The resistor R12 is connected to the connecting point of the resistors R14 and R15, and the other end of the resistor R12 is connected to the collector of the NPN transistor Q11. The base of the NPN transistor Q11 is connected to the collector of the NPN transistor Q12 and the resistor R11. The emitters of the NPN transistors Q11 and Q12 are grounded, and the base of the NPN transistor Q12 is connected to the connecting point of the resistor R16 of the time constant circuit 26 and the capacitor C11.

The push-pull circuit 23 has two parallel field-effect transistors (not shown), and the output terminal is connected to both ends of the primary side coil of the step-up transformer 24. A serial circuit of the resistor R13 and the discharge lamp 6 is connected to the secondary side of the step-up transformer 24.

Next, the operation of the lighting device 21 will be described with reference to the waveform diagram in FIGS. 6A through 6F, which each illustrates a voltage waveform at the points (a) through (f) in FIG. 1. When the lighting switch SW11 in FIG. 1 is turned on at point in time t1, as illustrated in FIG. 6A, the control voltage of the chopper circuit 28 assumes ground potential, and the potential Vb at point (b) which is the output of the chopper circuit 28 becomes the predetermined voltage Vb1 at illumination starting time from point in time t2 which is slightly later than point in time t1. This voltage is applied at the midpoint on the primary side of the step-up transformer 24.

Figures 6B, 6C, 6D:
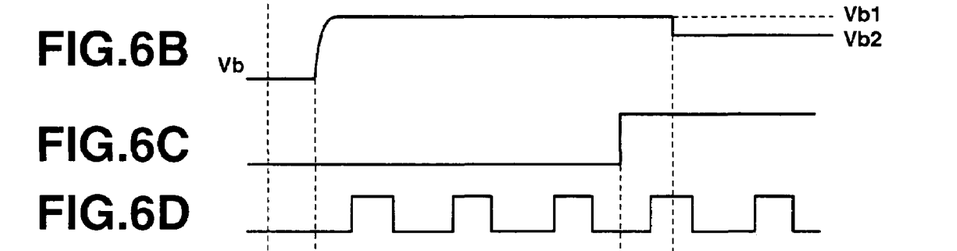

Before the output voltage of the chopper circuit 28 is output, the NPN transistor Q11 is in the off position. In this state, as illustrated in FIG. 6B, when the output voltage Vb of the chopper circuit 28 increases, the base potential of the NPN transistor Q11 increases, and this transistor turns to the on position. The resistor R12 is thus connected in parallel to the resistor R15, and the voltage detection level of the midpoint of the resistors R14 and R15 decreases, and the potential Vb of the chopper circuit 28 output increases.

Figures 6E, 6F:
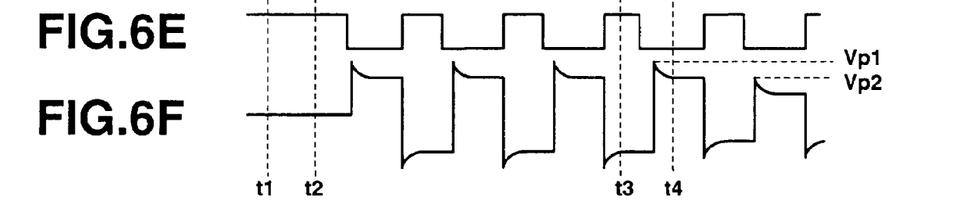

On the other hand, the push-pull circuit 23 applies an opposite driving pulse to each of the both ends of the primary side coil of the transformer 24, as illustrated in FIGS. 6D and 6E. Thus, as illustrated in FIG. 6C, the voltage which was increased at the step-up transformer 24 achieves the predetermined voltage, and at the point in time t3, the discharge lamp 6 is illuminated.

When the discharge lamp 6 is illuminated, current flows to the resistor R13, and current flows to the time constant circuit 26 via the diode D11. Also, the potential Vt at the connecting point of the resistor R16 and the capacitor C1 increases, and at point in time t4 and NPN transistor Q12 is turned on. The time until the NPN transistor Q12 is turned on is a time constant, that is to say, is determined by the product of the resistor R16 and the capacitor C11 of the time constant circuit 26.

When the NPN transistor Q12 is turned on, the base potential of the NPN transistor Q11 assumes ground potential, and the transistor Q11 once again is turned to the off position. Accordingly, the control voltage of the chopper circuit 28 can be obtained by the division by the resistors R14 and R15. Thus, the output voltage Vb of the chopper circuit 28 becomes potential Vb2 which is slightly lower than the above-mentioned potential Vb1. Accordingly, the waveform peak potential Vp applied to the discharge lamp 6 hereafter becomes the potential Vp2 which is slightly lower than the Vp1, as illustrated in FIG. 6F.

Thus, starting from illumination until a predetermined time (t1 through t4), a relatively high voltage is applied to the discharge lamp 6, but after point in time t4, a voltage which is lower than this voltage is applied to the discharge lamp 6.

Figure 7A:
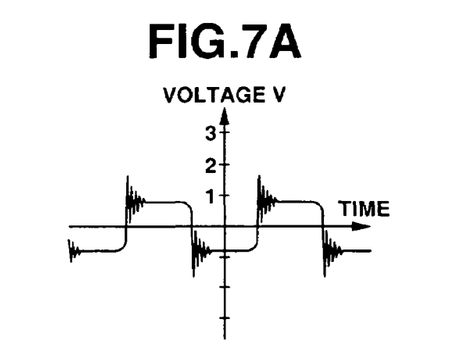
FIGS. 7A and 7B illustrate the properties of output voltage Vb.
Figure 7B:
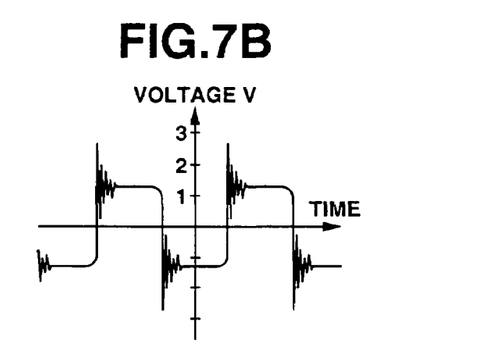

FIGS. 7A and 7B are explanatory diagrams illustrating the properties of output voltage Vb. FIG. 7A represents time with the horizontal axis and voltage with the vertical axis, and illustrates a conventional example of a no-load output voltage waveform. FIG. 7B represents voltage with the vertical axis and time with the horizontal axis, and illustrates an example of a no-load output voltage waveform according to the present embodiment.

As illustrated in FIGS. 7A and 7B, with the present embodiment, it is apparent that a sufficiently large voltage level is supplied at the time of start-up. Thus, with the present embodiment, the discharge lamp 6 can be lit with certainty.

Thus with the present embodiment, a special circuit such as a separate high-voltage circuit is not necessary, and a high start-up voltage is supplied to a dielectric barrier discharge lamp such as an external electrode discharge lamp. After start-up, a predetermined constant voltage can be supplied to the external electrode discharge lamp in order to achieve continuous and stable illumination. In other words, even in dark environments wherein there is virtually no incoming light, or when using a discharge lamp at the end of its useful life, stable illumination can be achieved.

Figure 8:
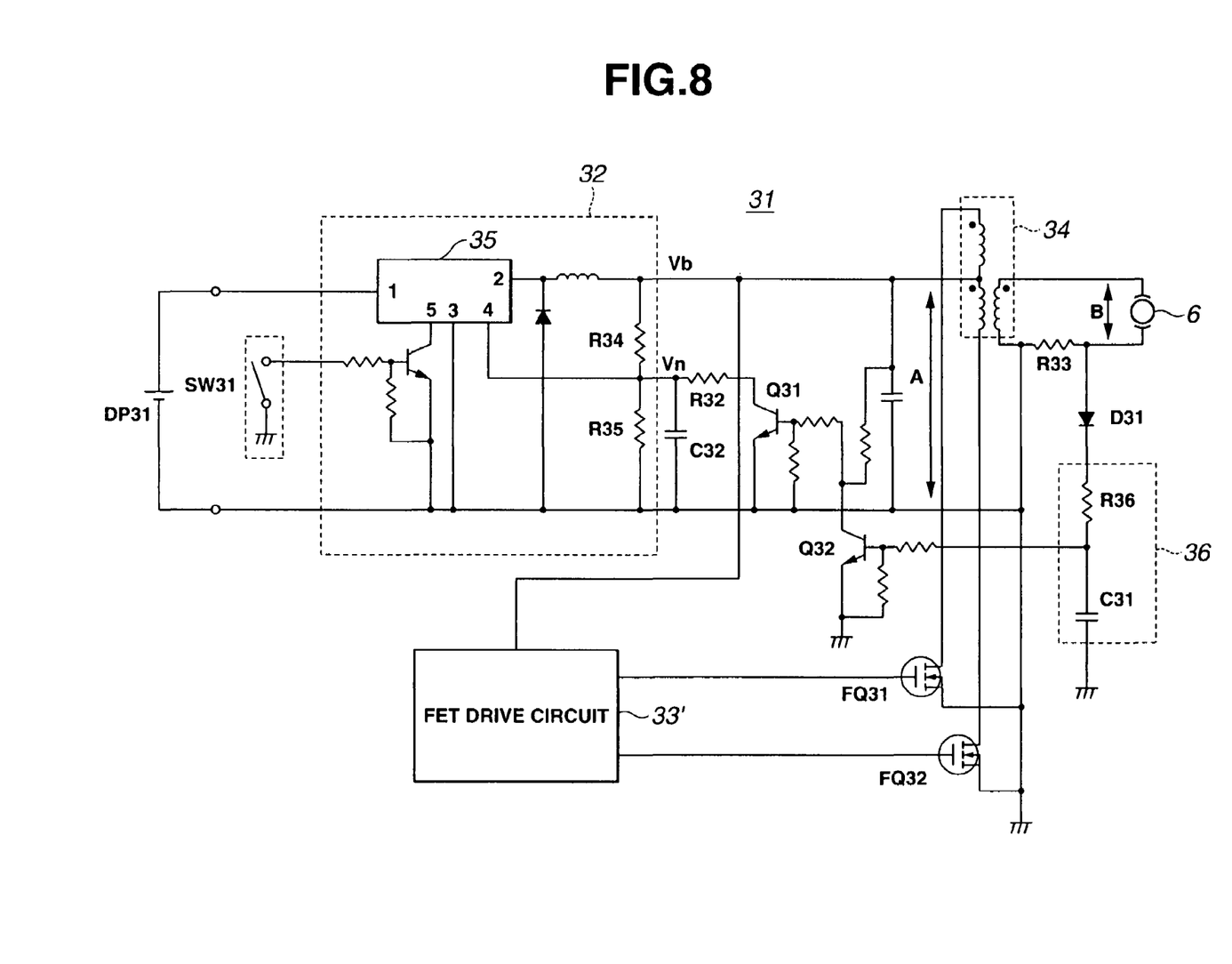
FIG. 8 illustrates in circuit diagram form an embodiment of a discharge lamp lighting device.

FIG. 8 illustrates a further detailed circuit configuration example of a discharge lamp lighting device according to an embodiment of the present invention illustrated in FIG. 1. FIG. 8 illustrates an embodiment that uses a step-down chopper circuit. FIG. 8 illustrates a circuit example using a step-down chopper module for circuit simplification. In FIG. 8, numerals 31 through 37 correspond respectively to the descriptions of numerals 21 through 27 in FIG. 1. Further, DC power source DP 31 corresponds to the DC power source DP 11, an illumination switch SW31 to the illumination switch SW11, resistors R32, R33, R34, R35, and R36 to resistors R12, R13, R14, R15, and R16-16 respectively. Also NPN transistors Q31 and Q32 correspond to the NPN transistors Q11 and Q12. Reference numeral 33' denotes an FET drive circuit which drives the field-effect transistors FQ31 and FQ32 with reverse polarity, and the field-effect transistors FQ31 and FQ32 and the FET drive circuit 33' are equivalent to the push-pull circuit 23 in FIG. 1.

In FIG. 8, the voltage control circuit 32 of the lighting device 31 is configured using an integrated circuit 1C35. A voltage of approximately 24 V is supplied from the DC power source DP 31 to the voltage control circuit 32. The voltage control circuit 32 supplies the terminal voltage A illustrated in FIG. 8. The output potential Vb reaches a predetermined potential Vb1 at illumination starting time, as with the case in the embodiment in FIG. 1.

When the illumination switch SW31 is turned off, the NPN transistor Q31 is in the off position, and when the illumination switch SW31 is turned on, the potential Vb increases, and the transistor Q31 turns on. Accordingly, the parallel resistance of the resistor R35 and the resistor R32 forms a serial connection to the resistor R34, and the voltage detection level decreases and therefore the output potential Vb of the voltage control circuit 32 increases.

On the other hand, under the control of the FET drive circuit 33', an inverse pulse is applied on the main coil side of a step-up transformer 34 by the field-effect transistors FQ31 and FQ32, and when the output voltage becomes high, the discharge lamp 6 is lit and current flows to a resistor R33. A portion of this current is input from a diode D31 to a time constant circuit 36, and potential is increased at the connection point of a resistor R36 and the capacitor C31 which configure the time constant circuit 36. The connection point potential is supplied to the base of the NPN transistor Q32, and the transistor Q32 changes from the off position to the on position.

The collector of the NPN transistor Q32 is connected to the base of the NPN transistor Q31 via a resistor, and the NPN transistor Q31 also changes from the on position to the off position. Accordingly, the only resistor to be serially connected to the resistor R14 is the resistor R15, and the voltage detection level is increased, and therefore the output potential Vb of the voltage control circuit 22 decreases slightly. The output voltage of the voltage control circuit 22 is input in the step-up transformer 34, and the electric potential of the output side of the transformer 34 decreases slightly. Thus, at the start time of illumination, a relatively high voltage is applied to the discharge lamp 6, and after a predetermined amount of time passes, a constant voltage which is lower than at the start time of illumination is applied to the discharge lamp 6.

Thus, when used in the dark, or when the discharge lamp is near the end of its usefully life, there is no need for a special circuit, and a dielectric barrier discharge lamp can be started with certainty, and afterwards stable illumination can be achieved. Also, the present embodiment has the advantage in that a step-down chopper circuit can be configured with one integrated circuit (IC).

Figure 9:
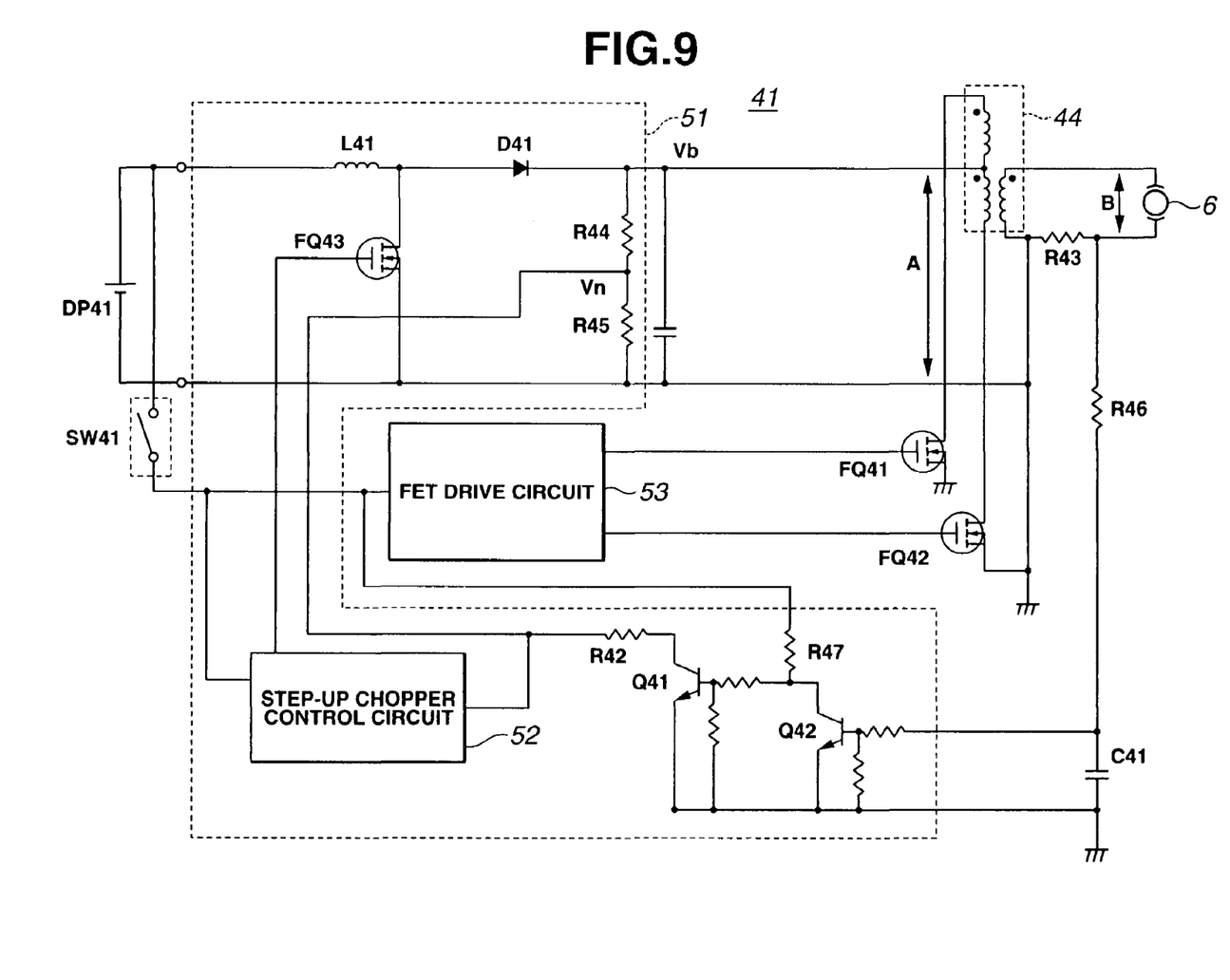
FIG. 9 illustrates a circuit diagram of a step-up chopper.

Now, while a discharge lamp lighting device using a step-down chopper circuit has been described in FIG. 8, the present invention can be carried out with a step-up chopper circuit instead of a step-down chopper circuit. FIG. 9 is a circuit diagram illustrating the configuration in this case.

In FIG. 9, reference numerals 41 and 44 correspond to the reference numerals 31 and 34 in FIG. 8, a DC power source DP 41 corresponds to the DC power source DP 31, the resistors R42, R43, R44, R45, and R46 correspond to resistors R32, R33, R34, R35, and R36, and a capacitor C41 corresponds to the capacitor C31. The resistor R46 and the capacitor C41 configure a time constant circuit.

Also, field-effect transistor FQ41 and FQ42 correspond to the field-effect transistor FQ31 and FQ32 in FIG. 8, and NPN transistors Q41 and Q42 correspond to the NPN transistor Q31 and Q32, and an FET drive circuit 53 corresponds to the FET drive circuit 33'. A step-up chopper circuit 51 comprises a coil L41, a diode D41, a field-effect transistor FQ43, resistors R42, R44, R45, R47, NPN transistors Q41 and Q42, and a step-up chopper control circuit 52.

When an illumination switch SW41 is turned on, the NPN transistor Q41 is turned to the on position and the NPN transistors Q42 is turned to the off position. Also the step-up chopper control circuit 52 and the FET drive circuit 53 are caused to operate, and the DC voltage stepped-up at the step-up chopper circuit 51 is applied to the resistor R44 and the resistor R45. The potential Vn is provided to the step-up chopper control circuit 52, and thus, the step-up chopper control circuit 52 changes the gate voltage of the transistor FQ43, and maintains the output potential Vb as a constant potential. The step-up chopper circuit 51 stores energy in the L41 when the transistor FQ 43 is turned on, and when the transistor FQ 43 is turned off the stored energy is discharged towards the load side, and smoothed by rectification by the diode D41 and the capacitor C42 so that a high DC voltage is output.

When the NPN transistor Q41 is tuned on, the resistor R42 is parallel to the resistor R45, and since the resistance value is decreased, the voltage detection level is decreased, and the output potential Vb is increased.

On the other hand, the output pulse from the field-effect transistors FQ41 and FQ42 which are controlled by the FET drive circuit 53 is supplied to the step-up transformer 44. When the voltage of the transformer 44 increases, the discharge lamp 6 illuminates. At this time, current flows to the resistor R43, and step up the base potential of the NPN transistor Q42 via the resistor R46. Thus, the transistor Q42 is changed from the off position to the on position. When the NPN transistor Q42 turned on, the base potential of the NPN transistor Q41 decreases, and the transistor Q41 is changed from the on position to the off position. Accordingly, the only resistor which is connected to the resistor R44 becomes the resistor R45, and since the voltage detection level increases, the output potential Vb decreases.

Thus, even in the example of FIG. 9, at the illumination starting time, the potential Vb increases, but after the discharge lamp 6 is illuminated and the predetermined amount of time has passed, the output potential Vb has a potential slightly lower than normal. Accordingly, with this embodiment also, when the dielectric barrier discharge lamp is used in the dark, or near the end of its useful life, stable illumination can be performed without a special circuit being added.

With the above-described embodiment, an example using an NPN type of transistor is described, but with the illumination device in the present invention, a PNP-type transistor can also be used, and in general any switching device can be used.

Figure 10:
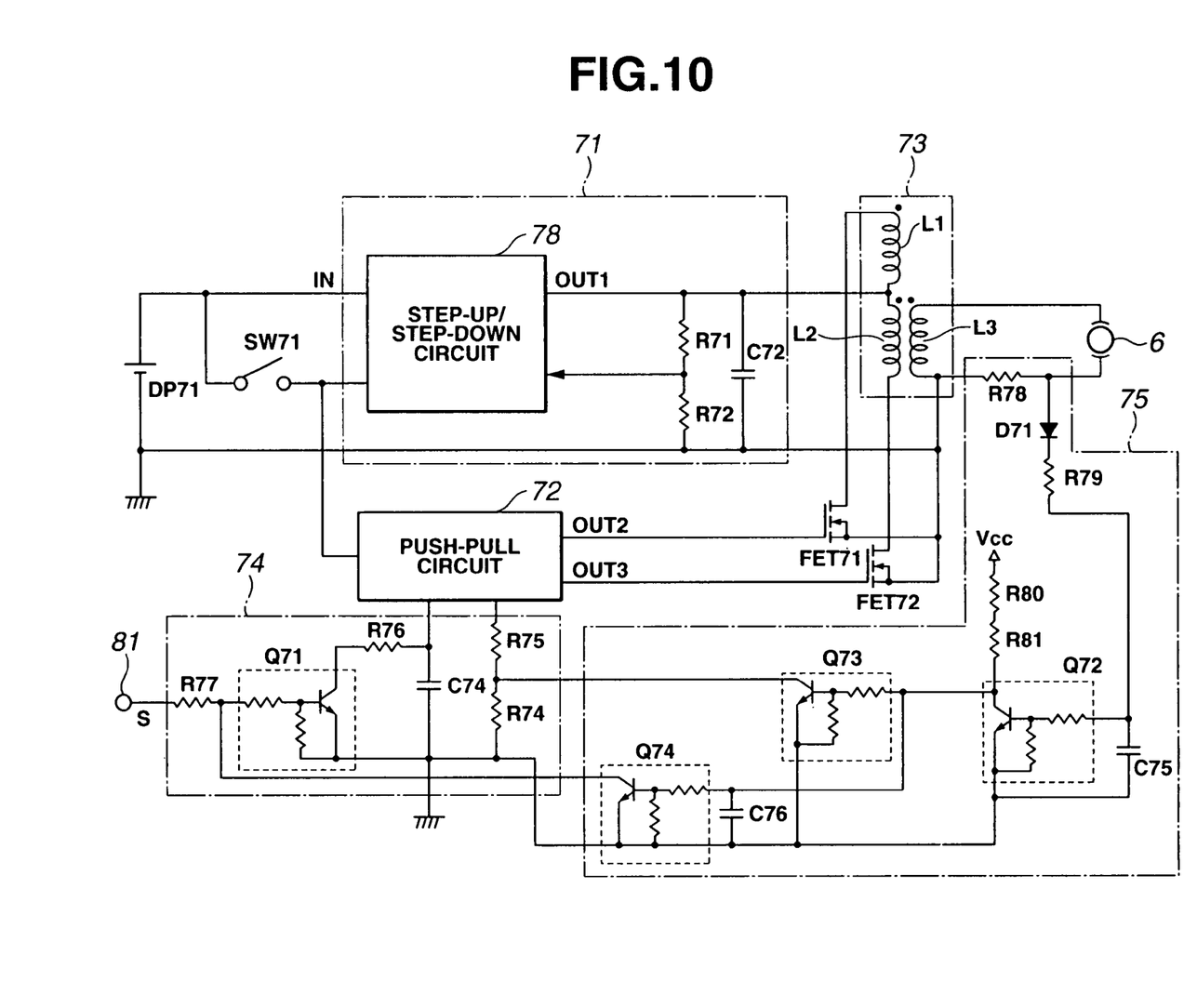
FIG. 10 illustrates in circuit diagram form an embodiment of a discharge lamp lighting device.

FIG. 10 is a circuit diagram illustrating the discharge lamp lighting device relating to the second embodiment of the present invention.

The illumination device relating to the present embodiment comprises a voltage control circuit 71 made up of a step-up/step-down circuit 78, resistors R71 and R72, and a capacitor C72; a DC power source DP71 connected to the voltage control circuit 71; an illumination switch SW71; a step-up transformer 73 formed of main coils L1 and L2 and a secondary coil L3; a push-pull circuit 72; an oscillating circuit 74 connected to the push-pull circuit 72 and made up of resistors R74 through R77, a capacitor C74, and a transistor Q74; a start-up circuit 75 made up of resistors R78 through R81, a diode D71, capacitors C75 and C76, and transistors Q72 through Q74; and field-effect transistors FET 71 and FET 72.

The voltage control circuit 71 comprises the step-up/step-down circuit 78, the resistor R71 and the resistor R72, and the capacitor C72. The DC power source DP71 and the illumination switch SW71 are connected to the step-up/step-down circuit 78. The DC power source DP71 for example has a voltage of 24 V, but this voltage can fluctuate plus or minus several percent, and therefore stability of the voltage is attempted by the voltage control circuit 71. In other words, the output of the DC power source DP71 is supplied to the step-up/step-down circuit 78. The step-up/step-down circuit 78 steps up or steps down the input voltage. The output voltage of the step-up/step-down circuit 78 is smoothed by the capacitor C72, divided by the resistor R71 and the resistor R72, and the voltage at the connection point of the resistors R71 and R72 is supplied to the step-up/step-down circuit 78 as the control voltage.

The push-pull circuit 72 is connected to the field-effect transistors FET71 and FET72, and the field-effect transistors FET71 and FET72 perform switching alternatively based on the drive signal output from the push-pull circuit 72, and a high voltage is generated on the secondary side of the step-up transformer 73.

The oscillating circuit 74 determines the oscillating frequency by the capacitor C74 and the resistors R74 and R75. The oscillating circuit 74 supplies an external light modulation synchronizing signal S to the transistor Q71 via the control terminal 81. The transistor Q71 controls on/off, and resets the oscillating of the oscillating circuit 74 when it is controlled to "on". As a result, the oscillating circuit 74 can oscillate at a frequency synchronized with the light modulation synchronizing signal S.

The start-up circuit 75 detects current flowing to the discharge lamp 6 with the resistor R78, which current is rectified by the diode D71, and with the voltage smoothed by the capacitor C75, the transistor Q72 is turned on and off, and frequency switching between start-up time and other than start-up time is performed. At start-up time, current does not flow to the dielectric barrier discharge lamp, and therefore the transistors Q72 is in the off position and the transistors Q73 and Q74 are in the on position, and the transistor Q71 is in the off position. Therefore, the light modulation synchronizing signal S is not input into the oscillating circuit 74, and also, since the transistor Q73 is in the on position, the oscillating frequency of the push-pull circuit 74 is determined with the capacitor C74 and the resistor R75. Other than at start-up time (time of dielectric barrier discharge lamp illumination), current flows to the dielectric barrier discharge lamp, the current is detected at the resistor R78, the resistor Q72 is in the on position, the transistors Q73 and Q74 are in the off position, and the push-pull circuit 72 oscillates at a frequency synchronized with the external modulated light synchronization signal S.

Next, the operation of the lighting device in FIG. 10 will be described with reference to FIGS. 11A through 12J. FIGS. 11A through 11E are timing charts at start-up time and FIGS. 12F through 12J are timing charts at illumination time.

First, the start-up time will be described with reference to FIGS. 11A through 11E. When the switch SW71 is turned on, power is supplied from the DC power source DP71 to the step-up/step-down circuit 78 and the push-pull circuit 72, and the step-up/step-down circuit 78 and the push-pull circuit 72 are turned to the on position. In the step-up/step-down circuit 78, the output voltage is output from the output OUT1 and load is gradually accumulated in the capacitor C72, and voltage is increased. At the same time, the divided voltage at the resistors R71 and R72 is sent as feedback to the step-up/step-down circuit 78, and the output OUT1 of the step-up/step-down circuit 78 is maintained as the constant voltage.

Figure 11A:
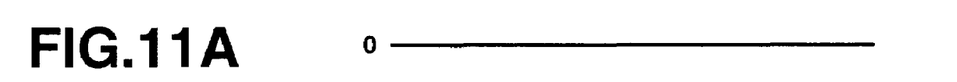
FIGS. 11A through 11E illustrate timing charts for describing the operation of the lighting device according to another embodiment.
Figure 11B:
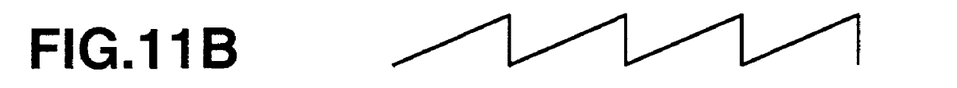

At this time, the discharge lamp 6 is in a non-illuminating state, and because current is not flowing to the resistor R78, the transistor R72 is turned off, the transistors Q73 and Q74 are on, and the transistor Q71 is off. Accordingly, the signal is not being supplied from the control terminal 81 to the oscillating circuit 74 as illustrated in FIG. 11A. The transistor Q73 is in the one position, and therefore, the oscillating frequency of the push-pull circuit 72 is determined by the capacitor C74 and the resistor R75, and results in the signal illustrated in FIG. 11B.

Figure 11C:
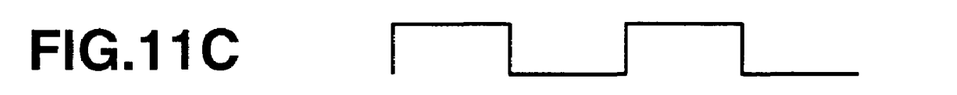
Figure 11D:
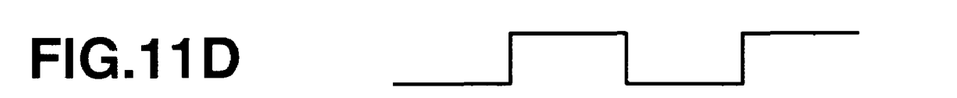
Figure 11E:
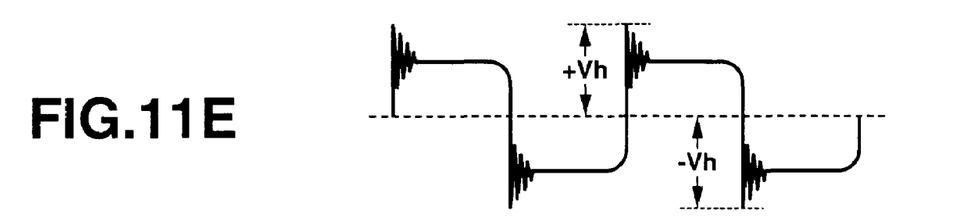

The push-pull circuit 72 which is turned on at the same time as the step-up/step-down circuit 78 outputs an inverse signal from the OUT2 and OUT3 thereof illustrated in FIGS. 11C and 11D, and controls the on/off switching of the field-effect transistors FET71 and FET72. When the field-effect transistor FET71 is turned on, current flows from the output OUT1 via the coil L1 of the step-up transformer 73 and the field-effect transistor FET71, and a positive high output voltage +Vh illustrated in FIG. 11E is obtained in the secondary coil L3 of the step-up transformer 73, according to the winding ratio of the coil L1. Also, when the field-effect transistsor FET72 is turned on, current flows from the output OUT1 via the coil L2 of the step-transformer 73 and the field-effect transistors FET72. In this case, the coil winding direction is the same as L1 and L2 and the current flow is in the reverse direction. Therefore, a negative high output voltage −Vh illustrated in FIG. 11E is obtained in the secondary coil L3 of the step-up transformer 73, according to the winding ratio of the coil L2. Thereafter, according to the on/off of the field-effect transistors FET71 and FET72, the output of the positive and negative high output voltage illustrated in FIG. 11E is supplied to the discharge lamp 6, and the discharge lamp 6 can be illuminated.

Figure 12F:
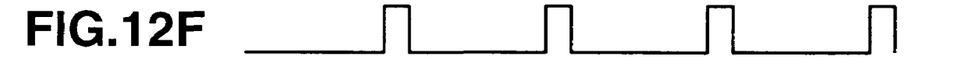
FIGS. 12F through 12J illustrates timing charts for describing the operation of the lighting device according to another embodiment.
Figure 12G:
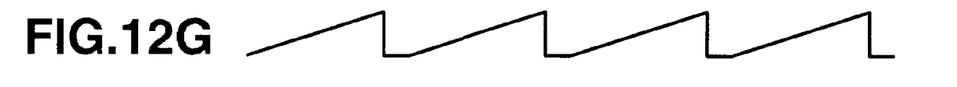

When the discharge lamp 6 is illuminated, the current flowing to the discharge lamp 6 is detected by the resistor R78, and the current is rectified by the diode D71, and with the voltage smoothed with the capacitor C75, the transistor Q72 is turned on, the transistors Q73 and Q74 are turned off, and the transistor Q71 is turned on. The transistor Q73 is in the off position, and therefore, the oscillating frequency of the push-pull circuit 72 is determined by the capacitor C74 and the resistors R75 and R74, and results in the signal illustrated in FIG. 12G. The light modulation synchronizing signal S illustrated in FIG. 12F is supplied to the control terminal 81 of the oscillating circuit 74, and with the frequency synchronized with this signal the push-pull circuit 72 outputs the signal illustrated in FIGS. 12H and 12I.

Figure 12H:
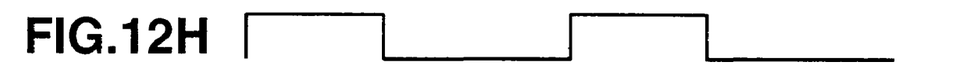
Figure 12I:
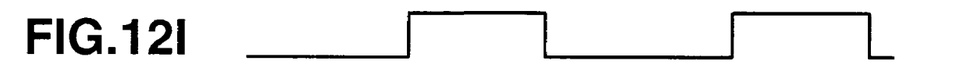
Figure 12J:
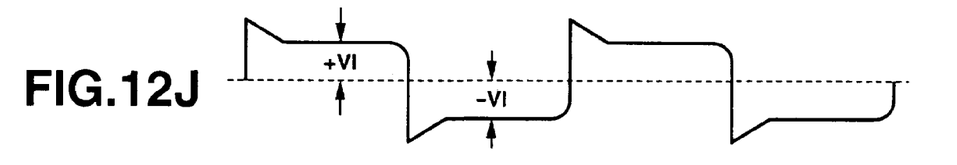

The field-effect transistors FET71 and FET72 have the on/off controlled by FIGS. 12H and 12I, respectively. When the field-effect transistor FET71 is turned on, current flows from the output OUT1 via the coil L1 of the step-up transformer 73 and the field-effect transistor FET71, and a positive low output voltage +V1 illustrated in FIG. 12J is obtained in the secondary coil L3 of the step-up transformer 73, according to the winding ratio of the coil L1. Also, when the field-effect transistor FET72 is turned on, current flows from the output OUT1 via the coil L2 of the step-up transformer 73 and the field-effect transistors FET72. In this case, the coil winding direction is the same as L1 and L2 and the current flow is in the reverse direction, and therefore a negative low output voltage −V1 illustrated in FIG. 12J is obtained in the secondary coil L3 of the step-up transformer 73, according to the winding ratio of the coil L2. Hereafter, according to the on/off of the field-effect transistors FET71 and FET72, the output of the positive and negative low output voltage illustrated in FIG. 12J is supplied to the discharge lamp 6 and the discharge lamp 6 can be illuminated with certainty.

Thus, by adding a simple start-up circuit 75, and by increasing the frequency of the push-pull circuit 72 at start-up time, a voltage of a sufficiently high level can be supplied at start-up time. Thus, the discharge lamp 6 which is a dielectric barrier discharge lamp can be illuminated with certainty.

With the present embodiment, a high start-up voltage can be supplied to a dielectric barrier discharge lamp such as an external electrode discharge lamp, without requiring a special circuit such as a high voltage circuit at start-up time, and after start-up a predetermined constant voltage can be applied and stable illumination can be continued.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A discharge lamp lighting device comprising:
 a transformer for supplying an illuminating voltage to a dielectric barrier discharge lamp;
 a voltage control circuit for generating and outputting a voltage supplied to a primary side of said transformer and controlling the generated voltage based on feedback of the outputted voltage;
 a converter having an output connected across the primary side of the transformer to convert the output of said voltage control circuit, in positive phase or reverse phase; and
 a start-up control circuit which detects an illumination current of said dielectric barrier discharge lamp, and switches the output voltage of said voltage control circuit between at start-up time and other than start-up time of said dielectric barrier discharge lamp by varying the voltage fed back to said voltage control circuit.

2. A discharge lamp lighting device according to claim 1, wherein said voltage control circuit is a step-down chopper circuit or a step-up chopper circuit.

3. A discharge lamp lighting device according to claim 1, wherein said start-up control circuit is such that the output voltage of said voltage control circuit is controlled so as to be higher at start-up time of said dielectric barrier discharge lamp than at time other than start-up time of said dielectric barrier discharge lamp.

4. A discharge lamp lighting device according to claim 1, said start-up control circuit further comprising:

a resistance circuit connected between the output ends of said voltage control circuit; and a parallel circuit, configured with at least one resistor and a switching device, connected in parallel to said resistance circuit;

wherein the conduction of said switching device is changed at the end of the start-up time, the at least one resistor being connected in parallel to said resistance circuit by the conducting of said switching device.

5. A discharge lamp lighting device according to claim 4, wherein said switching device is configured of a transistor wherein the conducting and non-conducting is controlled by the illuminating current of said dielectric barrier discharge lamp.

6. A discharge lamp lighting device comprising:

a transformer for supplying an illuminating voltage to a dielectric barrier discharge lamp connected to a secondary side;

a voltage control circuit for supplying voltage to a primary side of said transformer;

a converter having an output connected across the primary side of the transformer to convert the output of said voltage control circuit, in positive phase or reverse phase;

an oscillating circuit for generating a signal of which the oscillating frequency is varied; and a start-up control circuit which detects the start-up time or other than start-up time of said dielectric barrier discharge lamp, based on the illumination current of said dielectric barrier discharge lamp, and switches the oscillating frequency of said oscillating circuit depending on said start-up time or illuminating time.

7. A discharge lamp lighting device according to claim 6, wherein said voltage control circuit is a step-down chopper circuit or a step-up chopper circuit.

8. A discharge lamp lighting device according to claim 6, wherein said start-up control circuit is such that the oscillating frequency of said oscillating circuit is controlled so as to be higher at start-up time of said dielectric barrier discharge lamp than at a time other than start-up time of said dielectric barrier discharge lamp.

9. A discharge lamp lighting device according to claim 6, said start-up control circuit further comprising:

a capacitor and a resistance circuit for determining the oscillating frequency of said oscillating circuit;

wherein the resistance value of said resistance circuit is switched between at start-up time and other than start-up time of said dielectric barrier discharge lamp.

10. A discharge lamp lighting device according to claim 9, said resistance circuit comprising two resistors connected serially;

wherein said start-up control circuit switches the resistance value of said resistance circuit by short-circuiting one of said two resistances, with the switching device of which the conducting and non-conducting is controlled by the illuminating current of said dielectric barrier discharge lamp.

* * * * *